(12) United States Patent
Rafati

(10) Patent No.: US 7,327,994 B2
(45) Date of Patent: Feb. 5, 2008

(54) ARCHITECTURE FOR MULTIPLE-ANTENNA SYSTEMS

(76) Inventor: Hamid Rafati, 1540 Oak Creek Dr., #406, Palo Alto, CA (US) 94304

( * ) Notice: Subject to any disclaimer, the term of this patent is extended or adjusted under 35 U.S.C. 154(b) by 0 days.

(21) Appl. No.: 11/265,837

(22) Filed: Nov. 2, 2005

(65) Prior Publication Data

US 2006/0094385 A1 May 4, 2006

Related U.S. Application Data

(60) Provisional application No. 60/625,410, filed on Nov. 4, 2004, provisional application No. 60/688,868, filed on Jun. 8, 2005.

(51) Int. Cl.
*H04B 1/06* (2006.01)
*H04B 7/00* (2006.01)

(52) U.S. Cl. .................... 455/273; 455/276.1; 455/209

(58) Field of Classification Search ............... 455/272, 455/273, 276.1, 280, 209
See application file for complete search history.

(56) References Cited

U.S. PATENT DOCUMENTS 5,448,602 A * 9/1995 Ohmori et al. ............. 375/347
6,922,449 B1 * 7/2005 Bristow ...................... 375/316
2003/0072382 A1 4/2003 Raleigh et al.
2006/0073802 A1 * 4/2006 Chari et al. .............. 455/276.1

OTHER PUBLICATIONS

PCT International Search Report and Written Opinion, PCT/US05/40085, Feb. 26, 2007, 7 pages.

* cited by examiner

*Primary Examiner*—Edward F. Urban
*Assistant Examiner*—Christian A. Hannon
(74) *Attorney, Agent, or Firm*—Fenwick & West LLP (57) ABSTRACT

The invention is a system and method for sharing components of a single-path receiver or transmitter system multiple antennas. Specifically, according to one embodiment of the present invention, multiple antennas simultaneously share an analog-to-digital converter unit. The signal from one antenna is downconverted to a positive frequency band while the signal from another antenna is downconverted to a negative frequency band, allowing the signals to be processed by the analog-to-digital converter unit with minimal interference between signals and without the need for time-periodic switching. According to another embodiment of the present invention, multiple antennas simultaneously share a digital-to-analog converter unit.

11 Claims, 9 Drawing Sheets

ARCHITECTURE FOR MULTIPLE-ANTENNA SYSTEMS

RELATED APPLICATIONS

This application claims benefit from U.S. provisional application No. 60/625,410 filed Nov. 4, 2004 and from U.S. provisional application No. 60/688,868, filed Jun. 8, 2005 which are incorporated by reference herein in their entirety.

FIELD OF THE INVENTION

The invention relates generally to radio frequency receiver and transmitter systems, and, specifically, to radio frequency receiver and transmitter systems having multiple antennas.

BACKGROUND OF THE INVENTION

The use of multiple antennas and receivers can substantially boost the performance of wireless communication systems. For example, antenna diversity and beamforming techniques improve the link budget considerably. Moreover, multiple-input multiple-output (MIMO) systems can raise the channel capacity in the presence of multipath fading. The performance of wireless communication systems could be improved if there existed an efficient way to implement receivers and transmitters using multiple antennas. However, there are several requirements for multiple-antenna systems that have so far made implementation impractical.

One method for implementing a multiple-antenna receiver system is to implement an independent single-path receiver system (i.e., a receiver system that might ordinarily be connected to only a single antenna) for each of the multiple antennas. In this method, each antenna has its own dedicated receiver path for receiving the signal from that antenna. The number of receiver paths is equal to the number of antennas.

However, such an approach greatly increases power consumption and substantially increases the hardware required when compared to a single-antenna receiver system. A single-path receiver system normally consists of a low noise amplifier, a mixer for frequency translation, lowpass or bandpass filter for channel selection, automatic gain control, and an analog to digital converter unit. Assigning a dedicated single-path receiver system to each antenna requires duplication of all the components of the single-path receiver system.

Cost, size, and power constraints frequently render this method impractical. It is desirable to reduce the number of single-path receivers required in a multiple-antenna receiver system, or to otherwise eliminate redundancies among the multiple single-path receivers.

One method for reducing the hardware required for a multiple-antenna receiver is to switch the input connection to a single-path receiver system between multiple antennas in a periodic fashion. For example, if two antennas, Antenna A and Antenna B, were assigned to a single-path receiver system, Antenna A would be connected to the input of the single-path receiver system for a certain time period, then Antenna B would be connected to the input of the single-path receiver system for a similar time period, and so forth.

This switching configuration allows for a single-path receiver to receive the signal from one antenna for some time and the signal from another antenna for another time, thereby reducing the hardware required in the multiple dedicated single-path receiver approach. However, the switching step introduces several problems. For any switching rate, there is always an interfering signal that could corrupt the desired signal as a result of switching. Also, due to latency of the filters required in a receiver, artifacts of one antenna's signal remain in the receive-path for some time after the switch to another antenna has occurred, resulting in interference between the signals from various antennas. Switching between the signals from various antennas results in corruptions and interferences that impair the overall performance of the receiver system.

Similar challenges regarding cost, power, size, and interference exist in implementing multiple-antenna transmitter systems.

What is needed is a system and method for sharing components of a single-path receiver system between multiple antennas without introducing a time-periodic switch.

SUMMARY OF THE INVENTION

The invention is a system and method for sharing components of a single-path receiver or transmitter system between multiple antennas without introducing a time-periodic switch. Specifically, according to one embodiment of the present invention, multiple antennas simultaneously share an analog-to-digital converter unit. The signal from one antenna is downconverted to a positive frequency band while the signal from another antenna is downconverted to a negative frequency band, allowing the signals to be processed by the analog-to-digital converter unit with minimal interference between signals and without the need for time-periodic switching.

According to another embodiment of the present invention, multiple antenna transmitters share a digital-to-analog converter unit. The signal from one antenna is upconverted to a positive frequency band while the signal from another antenna is upconverted to a negative frequency band, allowing the signals to be processed by the digital-to-analog converter unit with minimal interference between signals and without the need for time-periodic switching.

As the analog-to-digital, and digital-to-analog converters units make up a significant portion of the size, cost, and power of a typical single-path receiver and transmitter, the advantages of reducing the number of analog-to-digital, and digital-to-analog converter units in a multiple-antenna receiver and transmitter system are significant.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Figure 1:
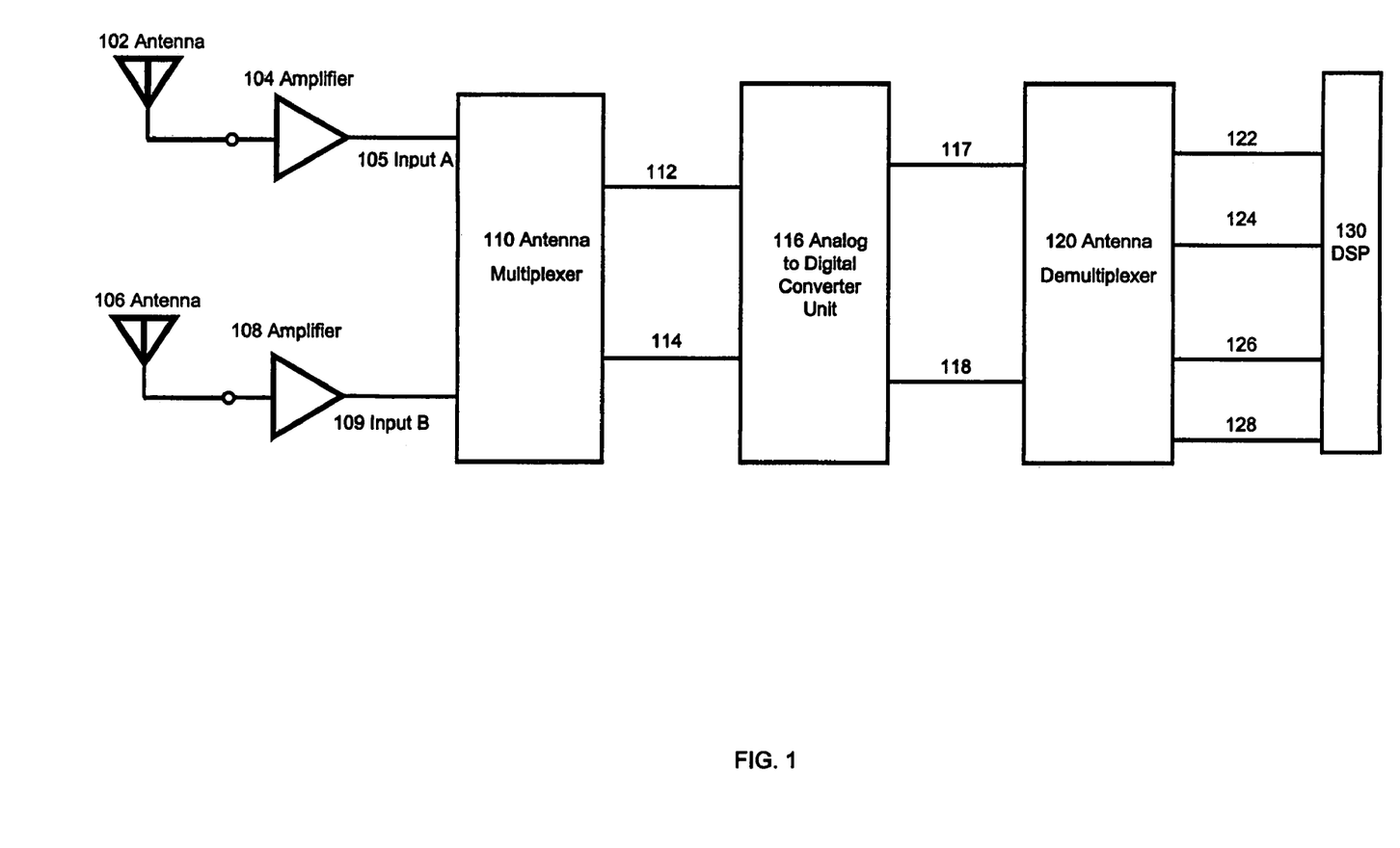
FIG. 1 is a block diagram illustrating the components of a multiple-antenna receiver system using a single analog-to-digital converter unit, according to one embodiment of the present invention.

FIG. 1 is a block diagram illustrating the components of a multiple-antenna receiver system using a single analog-to-digital converter unit, according to one embodiment of the present invention.

FIG. 1 illustrates an example of two antennas and one analog to digital converter unit, but one skilled in the art will recognize that the principles of the invention are equally applicable to other combinations of antennas and analog to digital converter units.

The antenna 102 is a standard antenna capable of receiving radio frequency signals, and is connected to an amplifier 104. The antenna 102 may be any one of the many commonly available antennas suitable to the application of the multiple-antenna receiver. For example, if the multiple-antenna receiver is for the purpose of cellular telephony, the antenna 102 may be a standard cellular phone antenna capable of receiving cellular telephone signals and of physical dimensions appropriate for a cellular telephone.

The amplifier 104 is capable of increasing the power of an incoming signal over some desired frequency range. The amplifier 104 may be any one of the many commonly available amplifiers. According to one embodiment of the present invention, the amplifier 104 is a low noise amplifier. One embodiment of the amplifier 104 will be described in greater detail herein with reference to FIG. 6. The output of the amplifier 104 is the Input A 105 to the Antenna Multiplexer 110.

The antenna 106 is a standard antenna capable of receiving radio frequency signals, and is connected to an amplifier 108. The antenna 106 may be any one of the many commonly available antennas suitable to the application of the multiple-antenna receiver. For example, if the multiple-antenna receiver is for the purpose of cellular telephony, the antenna 106 may be a standard cellular phone antenna capable of receiving cellular telephone signals and of physical dimensions appropriate for a cellular telephone.

The amplifier 108 is capable of increasing the power of an incoming signal over some desired frequency range. The amplifier 108 may be any one of the many commonly available amplifiers. According to one embodiment of the present invention, the amplifier 108 is a low noise amplifier. One embodiment of the amplifier 108 will be described in greater detail herein with reference to FIG. 6. The output of the amplifier 108 is the Input B 109 to the Antenna Multiplexer 110.

The antenna multiplexer 110 receives two real inputs, combines them, and produces a complex output, comprising a real component of the output 112 and an imaginary component of the output 114. A method used by the antenna multiplexer 110, according to one embodiment of the present invention, will be described in greater detail herein with reference to FIG. 4.

The analog to digital converter unit 116 receives the real component of the output 112 and the imaginary component of the output 114, converts them to digital form, and produces a real component of the digital output 117 and an imaginary component of the digital output 118. According to one embodiment of the present invention, the analog to digital converter unit 116 may be realized by combining two analog to digital converters each capable of converting one analog input into a digital output. According to one embodiment of the present invention, the analog to digital converters convert analog input to digital outputs by sampling and discretizing the analog input.

According to one embodiment of the present invention, the analog to digital converter unit 116 may have additional analog to digital converters for converting differential real and differential imaginary signals.

From a design perspective, the analog to digital converter unit 116 is one of the most expensive components in terms of power, cost, and size. By pre-processing the inputs to the analog to digital converter unit 116 with the antenna multiplexer 110 and post-processing the outputs from the analog to digital converter unit 116 with the antenna demultiplexer 120, the present invention allows the signals from multiple antennas to be received using a single analog to digital converter unit 116, resulting in a savings of power, cost, and size.

The antenna demultiplexer 120 receives the real component of the digital output 117 and the imaginary component of the digital output 118, separates the two input signals, and outputs the real component of desired signal A at baseband 122, the imaginary component of desired signal A at baseband 124, the real component of desired signal B at baseband 126, and the imaginary component of desired signal B at baseband 128. For some applications, the antenna demultiplexer 120 is optional. A method used by the antenna demultiplexer 120, according to one embodiment of the present invention, will be described in greater detail herein with reference to FIG. 5.

The digital signal processing 130 receives the real component of desired signal A at baseband 122, the imaginary component of desired signal A at baseband 124, the real component of desired signal B at baseband 126, and the imaginary component of desired signal B at baseband 128 and performs the operations prescribed by the application. For example, if the multiple-antenna receiver is for the purpose of cellular telephony, the digital signal processing 130 may correlate the two input signals, demodulate the resulting unified signal, check the unified signal for errors, and interpret the unified signal as indicated by the cellular protocol. The digital signal processing 130 may perform various operations on the input signals depending on the application for which the multiple-antenna receiver is being used.

Figure 2:
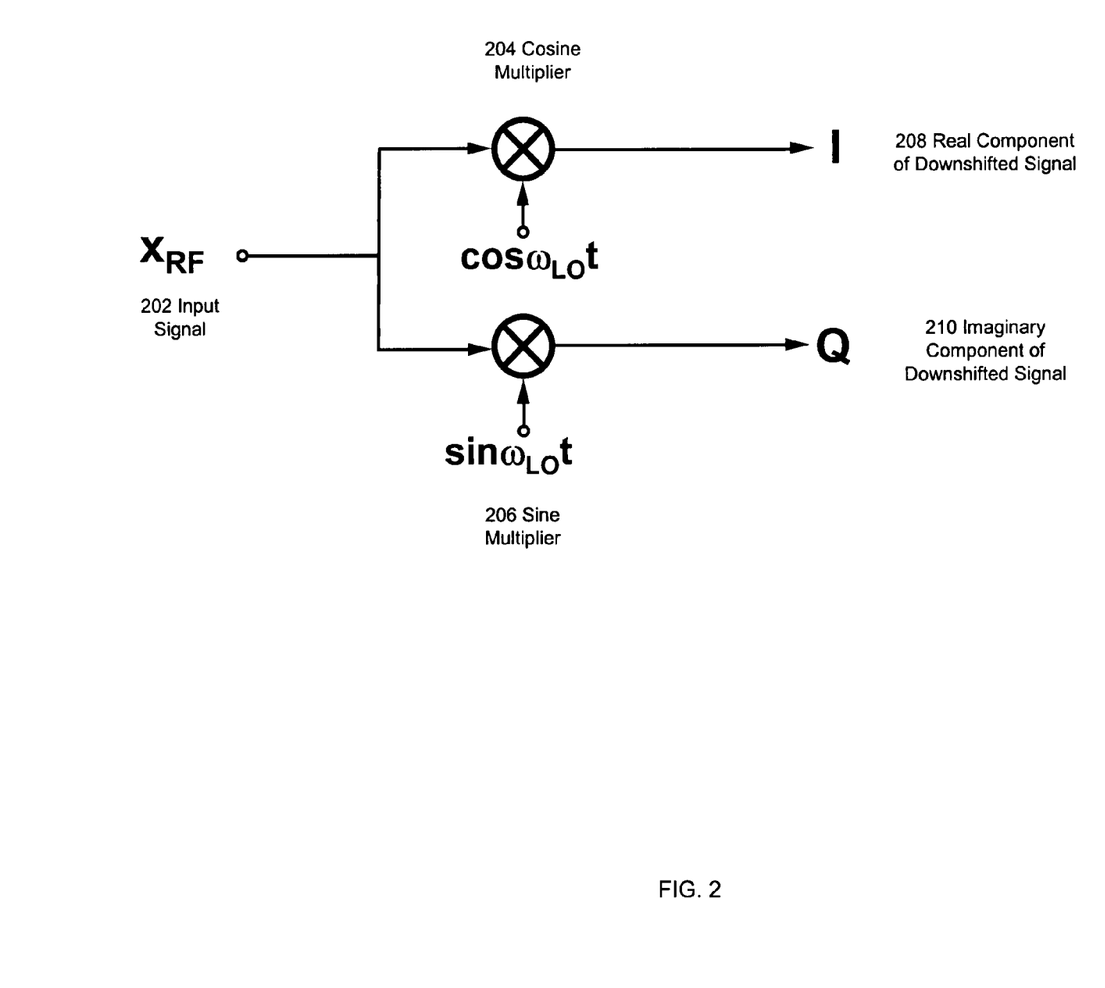
FIG. 2 is a block diagram illustrating a method for multiplying a real signal by a complex exponential, according to one embodiment of the present invention.
Figure 3:
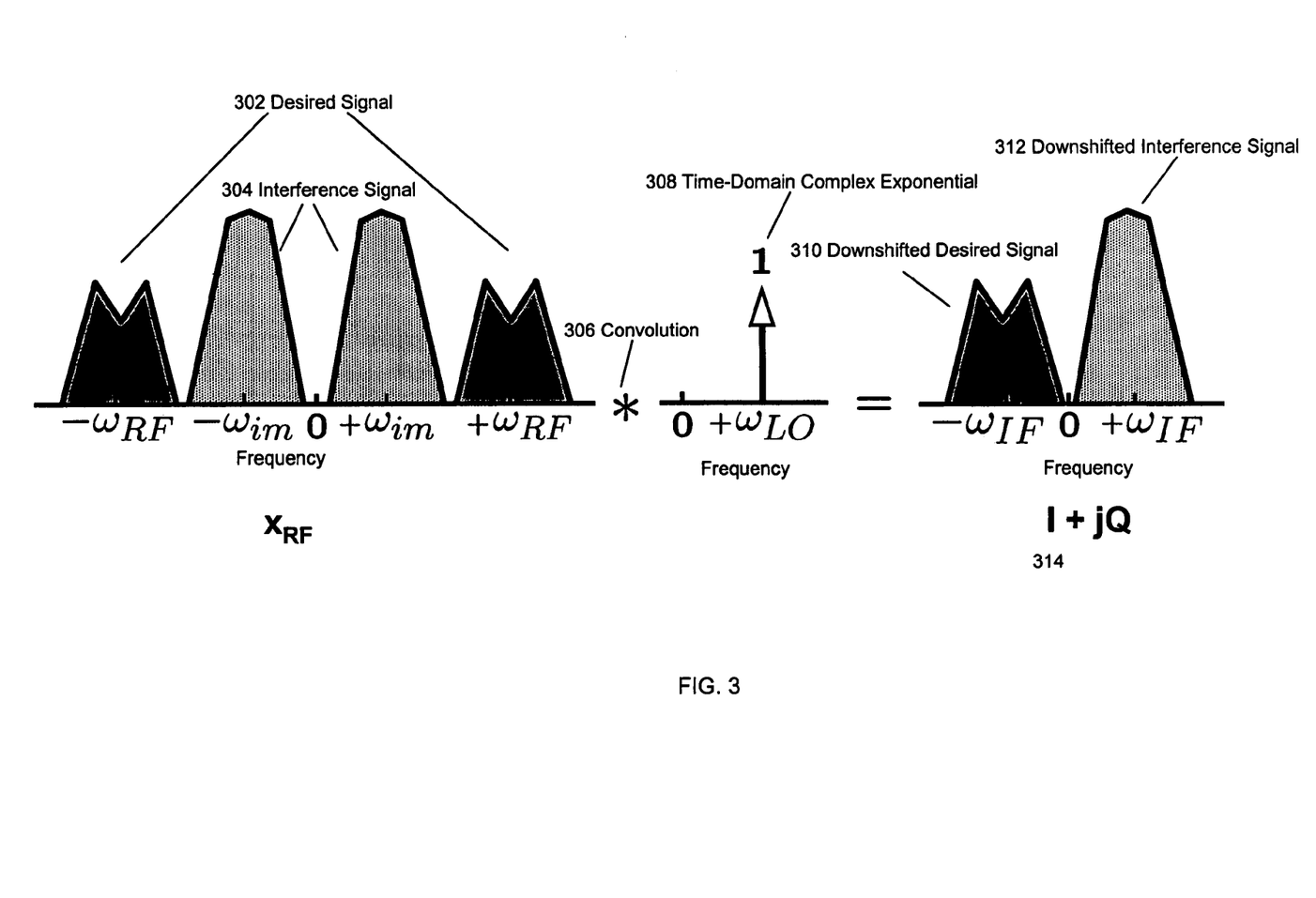
FIG. 3 is a collection of graphs illustrating in the frequency domain the effect of multiplying, in time domain, a real signal by a complex exponential, according to one embodiment of the present invention.

FIG. 2 is a block diagram illustrating a method for multiplying a real signal by a complex exponential, according to one embodiment of the present invention. The method of the antenna multiplexer 110, according to one embodiment of the present invention, includes the step multiplying of a real input signal by a complex exponential, such as:

$$x_{RF} \times e^{j\omega_{LO}} = I + jQ$$

where $x_{RF}$ is an input signal 202, $\omega_{LO}$ is some frequency (which will be described herein with reference to FIG. 3), I is the real component of the result of the multiplication, and Q is the imaginary component of the result of the multiplication. One skilled in the art will recognize that because the exponential is complex, the result of the multiplication may also be complex.

When $x_{RF}$ is a real signal (and in this case it always will be, since the input signal 202 must be real), $I = x_{RF} * \cos_{\omega_{LO}}(t)$ and $Q = x_{RF} * \sin_{\omega_{LO}}(t)$. Therefore, the multiplication of $x_{RF}$ by the complex exponential can be achieved by separately multiplying by a cosine and a sine to produce the real component of the result of the multiplication and an imaginary component of the result of the multiplication, respectively. According to one embodiment of the present invention, the multiplication is performed by a mixer. An implementation of a mixer, according to one embodiment of the present invention, is described in greater detail herein with reference to FIG. 7.

When $\omega_{LO}$ is chosen appropriately (which will be described herein with reference to FIG. 3), the result of the multiplication by the complex exponential will be a downshifted version of the input signal 202. The real component of the result of the multiplication will be the real component of the downshifted signal 208 and the imaginary component of the result of the multiplication will be the imaginary component of the downshifted signal 210.

FIG. 3 is a collection of graphs illustrating in the frequency domain the effect of multiplying, in time domain, a real signal by a complex exponential, according to one embodiment of the present invention. In the example shown, the input signal 202, shown as $x_{RF}$, comprises a desired signal 302 and an interference signal 304, separated by some margin in the frequency domain. The desired signal 302 is the signal intended to be received by the multiple-antenna receiver system. The interference signal 304 may be any unwanted signal, such as noise or activity on neighboring frequencies.

The time-domain complex exponential 308 corresponds to a shifted impulse function in the frequency domain. The impulse function is positioned at the frequency $\omega_{LO}$ corresponding to the frequency $\omega_{LO}$ of the time-domain complex exponential 308.

According to one embodiment of the present invention, $\omega_{LO}$ should be selected so that it is near the band edge of the desired signal 302.

One skilled in the art will recognize that the multiplication of the input signal in the time domain depicted in FIG. 2 corresponds to a convolution 306 in the frequency domain. Thus the frequency domain representation of the input signal 202 is convolved 306 by the frequency domain representation of the time-domain complex exponential 308, i.e. the shifted impulse function at $\omega_{LO}$.

The result of the convolution in the frequency domain is a downshifting of the input signal 202 spectrum by the frequency $\omega_{LO}$. Portions of the input signal at negative $\omega_{LO}$ are shifted to the origin in the downshifted signal, portions of the input signal lower in frequency than negative $\omega_{LO}$ are shifted towards the origin but remain negative in frequency, and portions of the input signal higher in frequency than negative $\omega_{LO}$ are shifted past the origin to become positive in frequency. The result of the appropriate selection of $\omega_{LO}$ is that, in the example shown, the downshifted desired signal 310 resides in negative frequency range while the downshifted interference signal 312 resides in positive frequency range.

For the purpose of example, the case has been illustrated in which the downshifted desired signal 310 resides in negative frequency range and the downshifted interference signal 312 resides in positive frequency range. One skilled in the art will recognize that the downshifted desired signal 310 may be downshifted to any frequency band and the downshifted interference signal 312 may be downshifted to any frequency band. According to one embodiment of the present invention, the downshifted desired signal 310 and the downshifted interference signal 312 are contained in frequency bands on opposite sides of the origin.

For the purpose of clarity, the shifting of signals has been consistently referred to as downshifting. One skilled in the art will recognize that an upshift can be achieved by downshifting by a different frequency, and that all forms of shifting may be equally applied in the present invention.

According to one embodiment of the present invention, the complex exponential has negative frequency. According to one embodiment of the present invention, the downshifted desired signal 310 resides in positive frequency range while the downshifted interference signal 312 resides in negative frequency range.

The downshifted signal is represented by the sum of I and j*Q, and is depicted in the frequency domain 314. In practice, the downshifted signal may comprise additional higher frequency components not shown. According to one embodiment of the present invention, these high frequency components may be removed by a low-pass filter.

Figure 4:
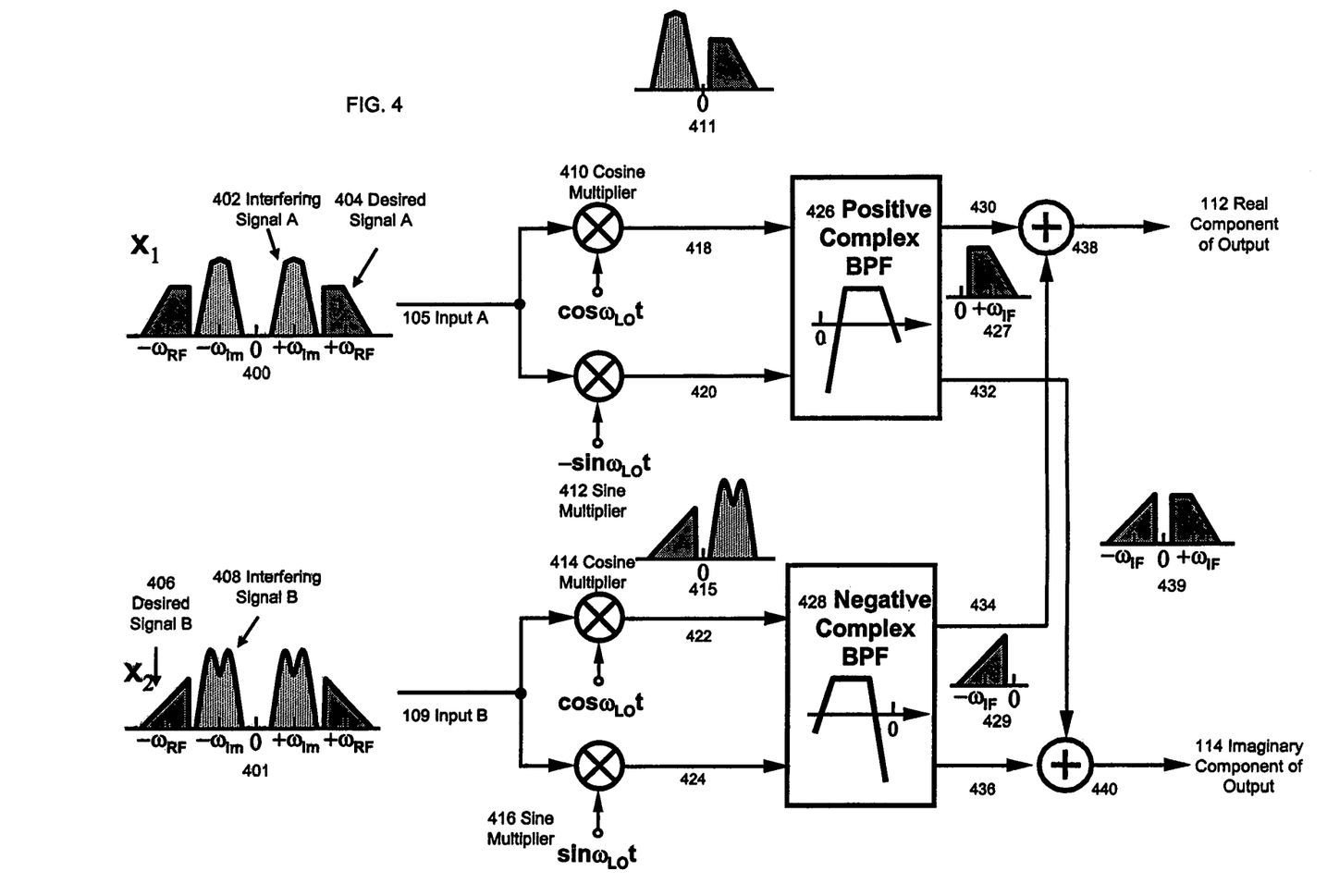
FIG. 4 is a block diagram illustrating a method for combining two input signals into a common signal, according to one embodiment of the present invention.

FIG. 4 is a block diagram illustrating a method for combining two input signals into a common signal, according to one embodiment of the present invention. According to one embodiment of the present invention, the method is performed by the antenna multiplexer 110.

In the example shown, the frequency domain representation 400 of Input A 105 comprises an interfering signal A 402 and a desired signal A 404. These signals are analogous to the interfering signal 304 and the desired signal 302, respectively, herein described with reference to FIG. 3. The shape and texture, of the interfering signal A 402 and the desired signal A 404 will be used consistently through FIG. 4 to depict the position and presence of these signals throughout the method.

The input A 105 is multiplied by the cosine multiplier 410 to produce the real component of a downshifted input A signal 418. The multiplication of the input A 105 by a cosine is analogous to the multiplication of the input signal 202 by a cosine 204 herein described with reference to FIG. 2. According to one embodiment of the present invention, the multiplication by a cosine is performed by a mixer.

The input A 105 is multiplied by the sine multiplier 412 to produce the imaginary component of a downshifted input A signal 420. The multiplication of the input A 105 by a sine is analogous to the multiplication of the input signal 202 by a sine 206 herein described with reference to FIG. 2. According to one embodiment of the present invention, the multiplication by a sine is performed by a mixer.

The combination of the real component of a downshifted input A signal 418 and the imaginary component of a downshifted input A signal 420 is analogous to the output of the frequency domain convolution depicted in 314 of FIG. 3. The frequency domain representation of the combination of the real component of a downshifted input A signal 418 and the imaginary component of a downshifted input A signal 420 is depicted in 411. In practice, the downshifted signal may comprise additional higher frequency components not shown. According to one embodiment of the present invention, these high frequency components may be removed by a low-pass filter. The desired signal A 404 has been downshifted towards the origin but has positive frequency, while the interfering signal A 402 has been downshifted so that it has negative frequency.

The real component of a downshifted input A signal 418 and the imaginary component of a downshifted input A signal 420 are inputs to a positive complex band pass filter 426. According to one embodiment of the present invention, the positive complex band pass filter 426 has the property of selecting signals at certain positive frequencies while attenuating signals at other frequencies. The positive complex band pass filter 426 can be implemented using any of the many known filtering techniques for selecting signals at certain positive frequencies while attenuating signals at other frequencies. The positive complex band pass filter 426, according to one embodiment of the present invention, is described in greater herein with reference to FIG. 7.

The positive complex band pass filter 426 outputs the real component of processed input A 430 and the imaginary component of processed input A 432. The frequency domain representation of the combination of the real component of processed input A 430 and the imaginary component of processed input A 432 is depicted in 427. 427 illustrates that the desired signal A 404 has been downshifted to a positive intermediate frequency and that the presence of interfering signal A 402 has been significantly attenuated.

In the example shown, the frequency domain representation 401 of Input B 109 comprises an interfering signal B 408 and a desired signal B 406. These signals are analogous to the interfering signal 304 and the desired signal 302, respectively, herein described with reference to FIG. 3. The shape and texture of the interfering signal B 408 and the desired signal B 406 will be used consistently through FIG. 4 to depict the position and presence of these signals through the method depicted in FIG. 4.

The input B 109 is multiplied by the cosine multiplier 414 to produce the real component of a downshifted input B signal 422. The multiplication of the input B 109 by a cosine is analogous to the multiplication of the input signal 202 by a cosine 204 herein described with reference to FIG. 2. According to one embodiment of the present invention, the multiplication by a cosine is performed by a mixer.

The input B 109 is multiplied by the sine multiplier 416 to produce the imaginary component of a downshifted input B signal 424. The multiplication of the input B 109 by a sine is analogous to the multiplication of the input signal 202 by a sine 206 herein described with reference to FIG. 2. According to one embodiment of the present invention, the multiplication by a sine is performed by a mixer.

The combination of the real component of a downshifted input B signal 422 and the imaginary component of a downshifted input B signal 424 is analogous to the output of the frequency domain convolution depicted in 314 of FIG. 3. The frequency domain representation of the combination of the real component of a downshifted input B signal 422 and the imaginary component of a downshifted input B signal 424 is depicted in 415. In practice, the downshifted signal may comprise additional higher frequency components not shown. According to one embodiment of the present invention, these high frequency components may be removed by a low-pass filter. The interfering signal B 408 has been downshifted so that it has positive frequency, while the desired signal B 406 has been downshifted towards the origin but has negative frequency.

The real component of a downshifted input B signal 422 and the imaginary component of a downshifted input B signal 424 are inputs to a negative complex band pass filter 428. According to one embodiment of the present invention, the negative complex band pass filter 428 has the property of selecting signals at certain negative frequencies while attenuating signals at other frequencies. The negative complex band pass filter 428 can be implemented using any of the many known filtering techniques for selecting signals at certain negative frequencies while attenuating signals at other frequencies. The negative complex band pass filter 428, according to one embodiment of the present invention, is described in greater herein with reference to FIG. 7.

The negative complex band pass filter 428 outputs the real component of processed input B 434 and the imaginary component of processed input B 436. The frequency domain representation of the combination of the real component of processed input B 434 and the imaginary component of processed input B 436 is depicted in 429. 429 illustrates that the desired signal B 406 has been downshifted to a negative intermediate frequency and that the presence of interfering signal B 408 has been significantly attenuated.

The summer 438 may be any device capable of combining two inputs to produce an output. The summer 438 combines the real component of processed input A 430 with the real component of processed input B 434 to produce the real component of the output 112.

The summer 446 may be any device capable of combining two inputs to produce an output. The summer 440 combines the imaginary component of processed input A 432 with the imaginary component of processed input B 436 to produce the imaginary component of the output 114.

The frequency domain representation of the combination of the real component of the output 112 and the imaginary component of the output 114 is depicted in 439. The desired signal A 404 has been downshifted to a positive intermediate frequency and the desired signal B 406 has been downshifted to a negative intermediate frequency. The output of the antenna multiplexer contains the desired signals from both inputs, with the desired signal from one input residing in the positive frequency range and the desired signal from the other input residing in the negative frequency range.

Both inputs are combined into a single signal, which can then be processed by a single analog-to-digital converter unit. By enabling multiple inputs to be processed by a single analog-to-digital converter unit, the present invention reduces the number of analog-to-digital converters in a multiple-antenna receiver system, resulting in a savings in the cost, power consumption, and size of the receiver.

Figure 5:
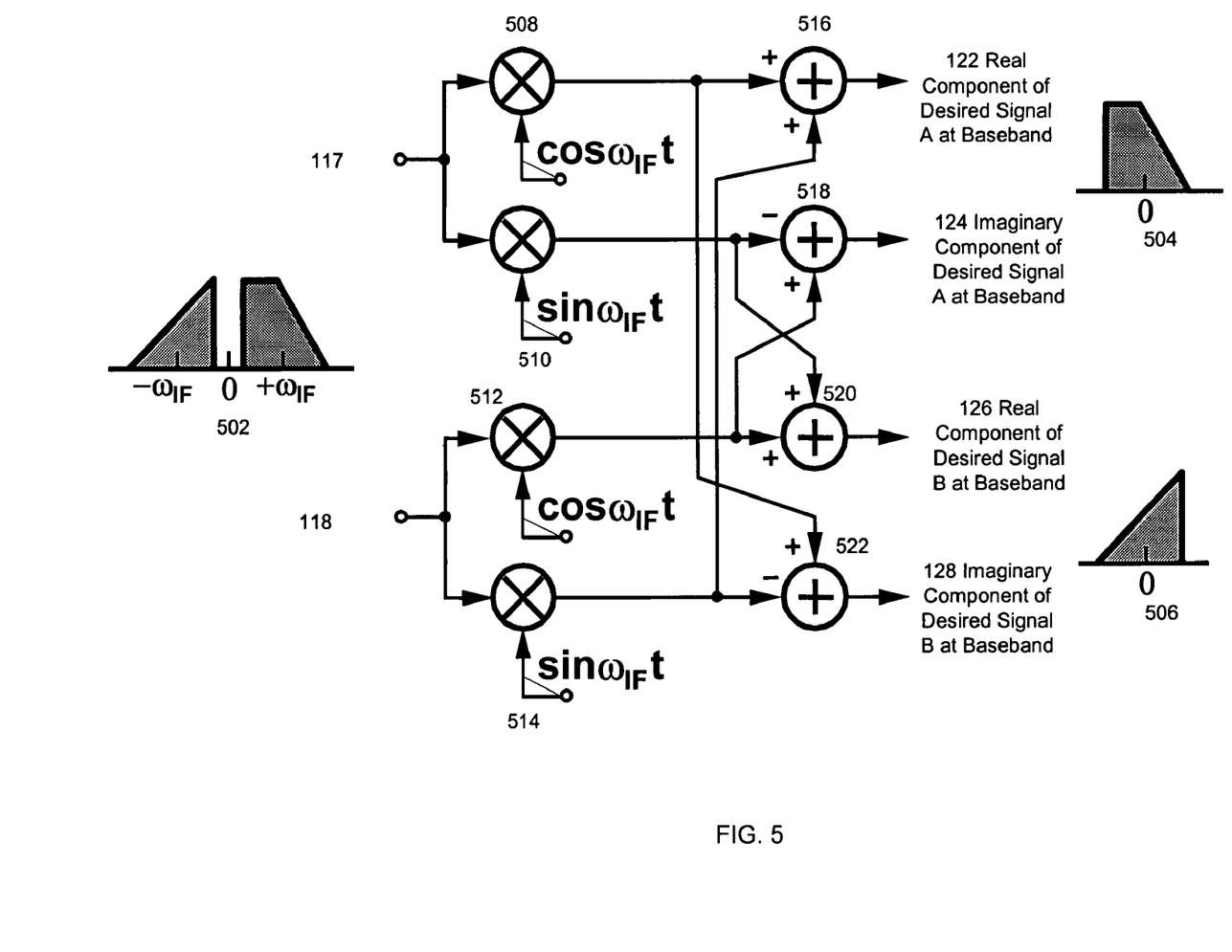
FIG. 5 is a block diagram illustrating a method for separating two input signals from a common signal, according to one embodiment of the present invention.

FIG. 5 is a block diagram illustrating a method for separating two input signals from a common signal, according to one embodiment of the present invention. According to one embodiment of the present invention, the method may be performed in the antenna demultiplexer 120. According to another embodiment of the present invention, the method may be performed in the digital signal processing 130.

According to one embodiment of the present invention, the input signals are separated after being converted to digital format by the analog-to-digital converter unit 116 so that the number of analog-to-digital converters used by the multiple-antenna receiver system may be reduced. However, according to one embodiment of the present invention, the input signals may be separated at any stage of the multiple-antenna receiver, and, according to another embodiment of the present invention, the input signals are not separated at all.

For the purposes of illustration, the antenna demultiplexer 120 will be shown as operating on digital signals, but it will be apparent to one of ordinary skill in the art that the method of the antenna demultiplexer 120 is applicable to analog signals as well.

The antenna demultiplexer 120 separates the digital output into desired signal A at baseband and desired signal B at baseband by multiplying by the complex exponential $e^{j*\omega_{IF}*t}$. As explained herein with reference to FIG. 3, multiplication by a complex exponential of a frequency $\omega_{IF}$ is synonymous to convolution by a shifted impulse function in the frequency domain. Multiplying a signal by a complex exponential results in downshifting the signal in the frequency domain by the frequency $\omega_{IF}$.

According to one embodiment of the present invention, $\omega_{IF}$ may be chosen to be at the center frequency of the band of the desired signal A 404. According to another embodiment of the present invention, $\omega_{IF}$ may be chosen to be at the center frequency of the band of the desired signal B 406. According to another embodiment of the present invention, $\omega_{IF}$ may be chosen as such that the desired signal at baseband has desired frequency domain characteristics.

According to one embodiment of the present invention, the antenna demultiplexer 120 separates the digital output into desired signal A at baseband by multiplying the digital output by a complex exponential $e^{j*\omega_{IF1}*t}$ and desired signal B at baseband by multiplying the digital output by the complex exponential $e^{j*\omega_{IF2}*t}$ The digital output depicted in the frequency domain by 502 is separated into the desired signal A at baseband as depicted in 504 by multiplying by a complex exponential of frequency negative $\omega_{IF}$. The desired signal A at baseband has the desired signal A 404 shifted such that portions of the signal previously at a frequency $\omega$ are now at the origin. In practice, the result of the multiplication by the complex exponential may have other higher frequency artifacts not depicted in 504, but these can be removed by a low-pass filtering step (not shown). The low-pass filtering may be performed using any of the many available methods for low-pass filtering.

The multiplication of the (complex) digital output and the complex exponential can implemented as follows. The real component of the result of the multiplication, in this case the real component of desired signal A at baseband 122, is equal to the real component of the digital output 117 multiplied by a cosine signal 508, combined 516 with the imaginary component of the digital output 118 multiplied by a sine signal 514. The imaginary component of the result of the multiplication, in this case the imaginary component of the desired signal A at baseband 124, is equal to the imaginary component of the digital output 118 multiplied by a cosine signal 512, combined 518 with the negative of the real component of the digital output 117 multiplied by a sine signal 510. The combination of the real component of desired signal A at baseband 122 and the imaginary component of the desired signal A at baseband 124 is represented in the frequency domain as 504, with additional artifacts not shown.

The digital output depicted in the frequency domain by 502 is separated into the desired signal B 406 as depicted in 506 by multiplying by a complex exponential of frequency $\omega_{IF}$. The resulting signal has the desired signal B 406 shifted such that portions of the signal previously at some frequency ω are now at the origin. In practice, the result of the multiplication by the complex exponential may have other higher frequency artifacts not depicted in 504, but these can be removed by a low-pass filtering step (not shown). The low-pass filtering may be performed using any of the many available methods for low-pass filtering.

The multiplication of the (complex) digital output and the complex exponential can implemented as follows. The real component of the result of the multiplication, in this case the real component of desired signal B at baseband 126, is equal to the real component of the digital output 117 multiplied by a sine signal 510, combined 520 with the imaginary component of the digital output 118 multiplied by a cosine signal 512. The imaginary component of the result of the multiplication, in this case the imaginary component of the desired signal B at baseband 128, is equal to the negative of the imaginary component of the digital output 118 multiplied by a sine signal 514, combined 522 with the real component of the digital output 117 multiplied by a cosine signal 508. The combination of the real component of desired signal B at baseband 126 and the imaginary component of the desired signal B at baseband 128 is represented in the frequency domain as 506, with additional artifacts not shown.

The antenna demultiplexer 120 separates the desired component of multiple signals, converts them to baseband, and sends them to the digital signal processing 130, allowing for further processing of the signals received from the multiple antennas.

According to one embodiment of the present invention, the multiple-antenna receiver system receives multiple input signals, converts them to baseband, filters out unwanted signals, and converts the signals to a digital format, while only using a single analog-to-digital converter unit.

Figure 6:
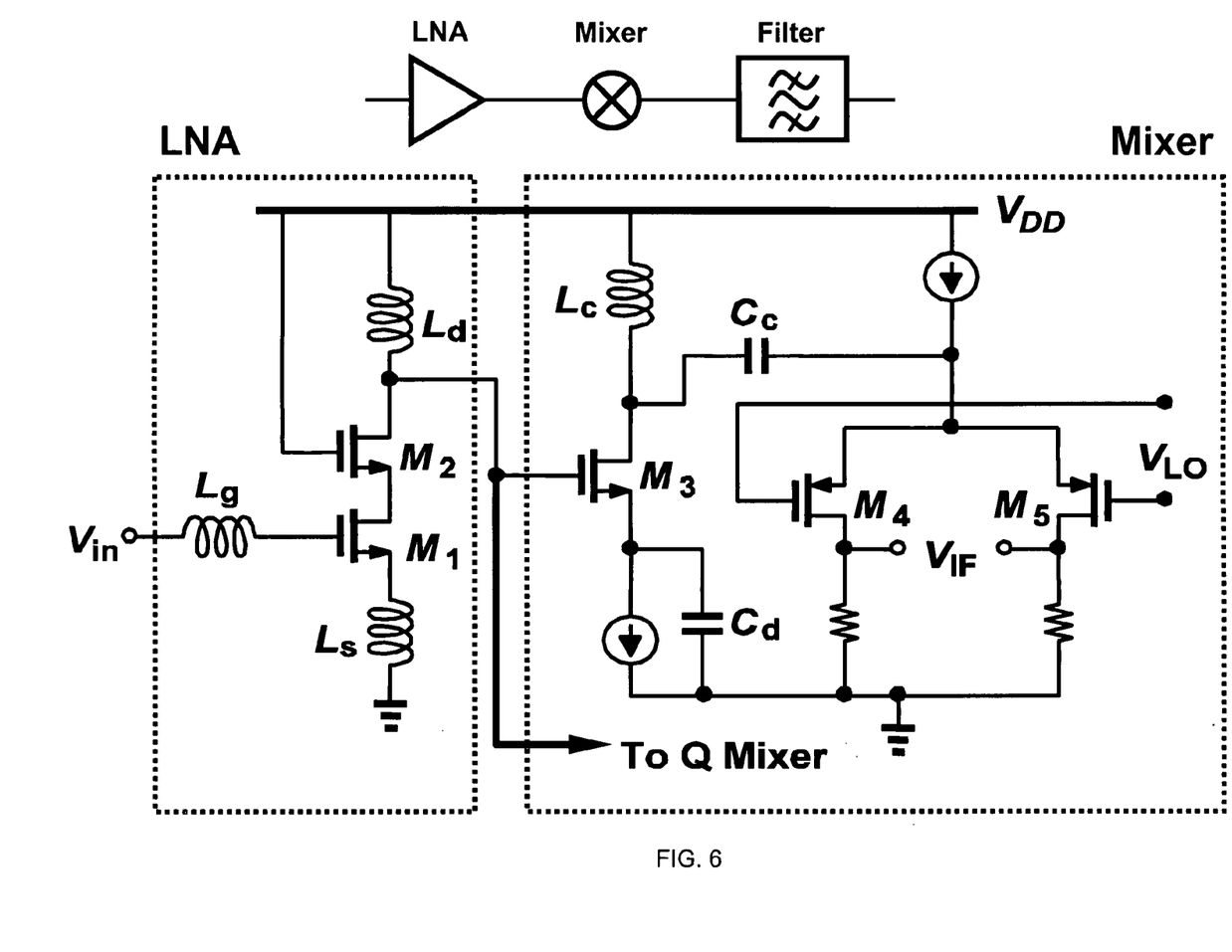
FIG. 6 is a circuit diagram illustrating a low noise amplifier and a mixer, according to one embodiment of the present invention.

FIG. 6 is a circuit diagram illustrating a low noise amplifier and a mixer, according to one embodiment of the present invention. FIG. 6 depicts the front end of each receive path. A cascode LNA with a voltage gain of 29 dB is followed by a mixer. The mixer incorporates a voltage-to-current converter, $M_3$, with capacitive degeneration so as to improve the linearity without degrading the noise figure. The high-pass network $L_c$ and $C_c$, also rejects low-frequency beat components that arise from even-order distortion in the LNA and in $M_3$, thus raising the $IP_2$. According to one embodiment of the present invention, to provide an output common-mode level compatible with the subsequent filter and lowering the 1/f noise, the switching pair employs PMOS devices.

Figure 7:
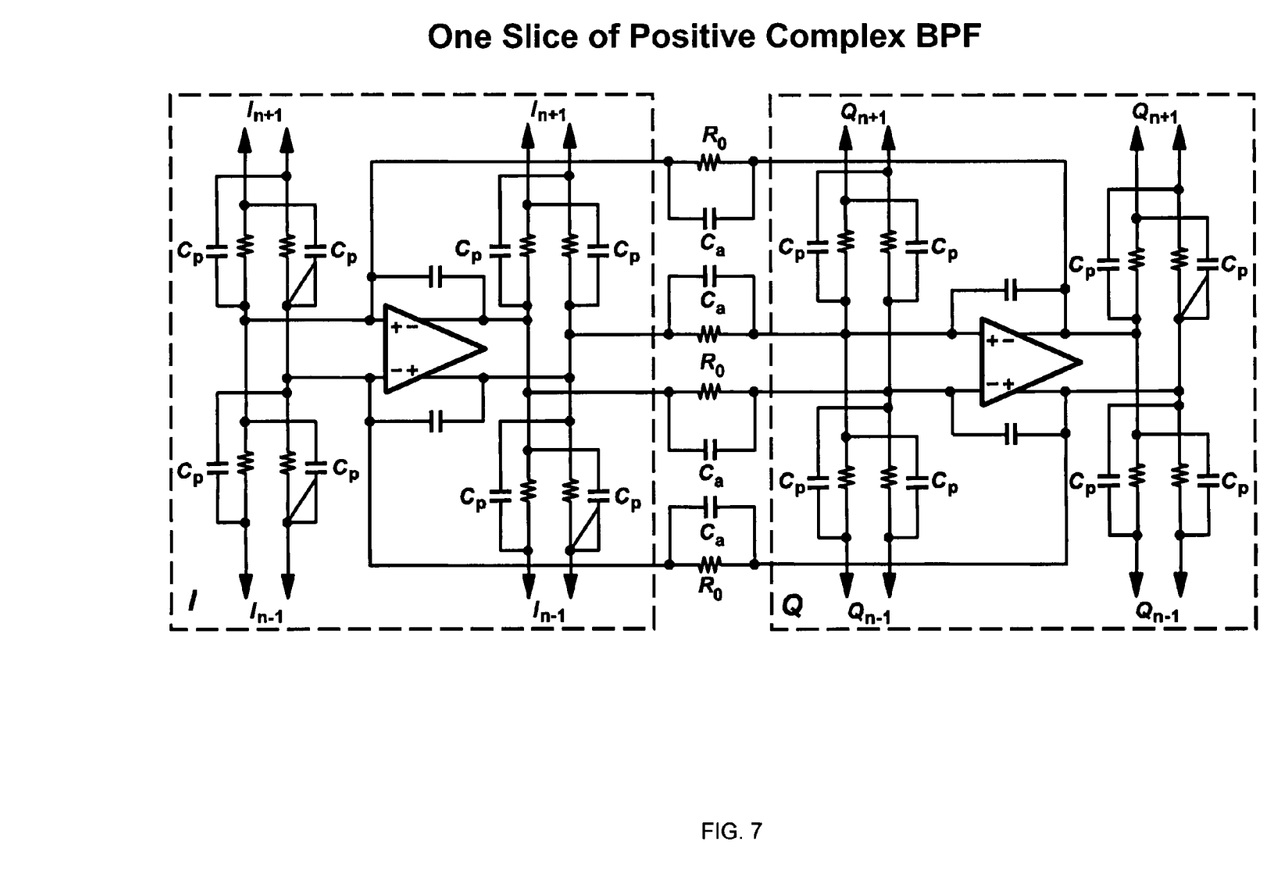
FIG. 7 is a circuit diagram illustrating one slice of a positive complex bandpass filter, according to one embodiment of the present invention.
Figure 8:
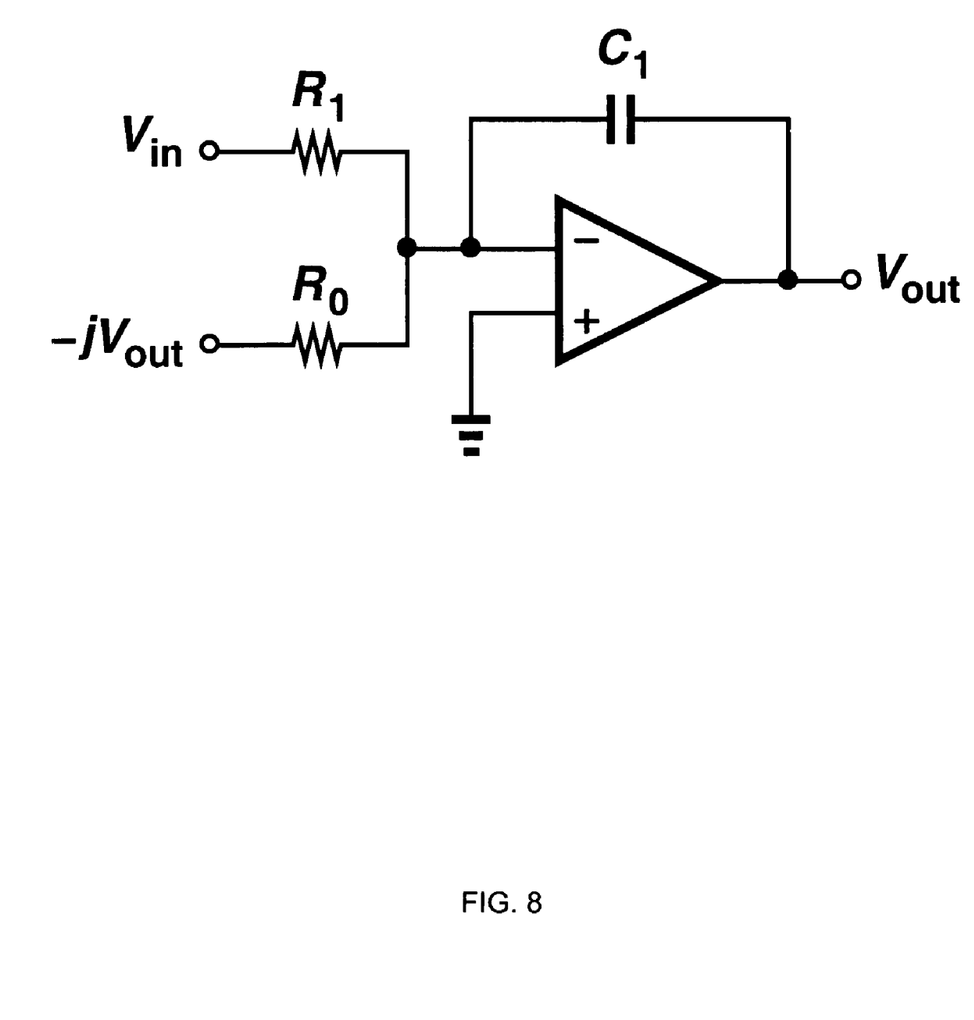
FIG. 8 is a circuit diagram illustrating a single-ended integrator, according to one embodiment of the present invention.
Figure 9:
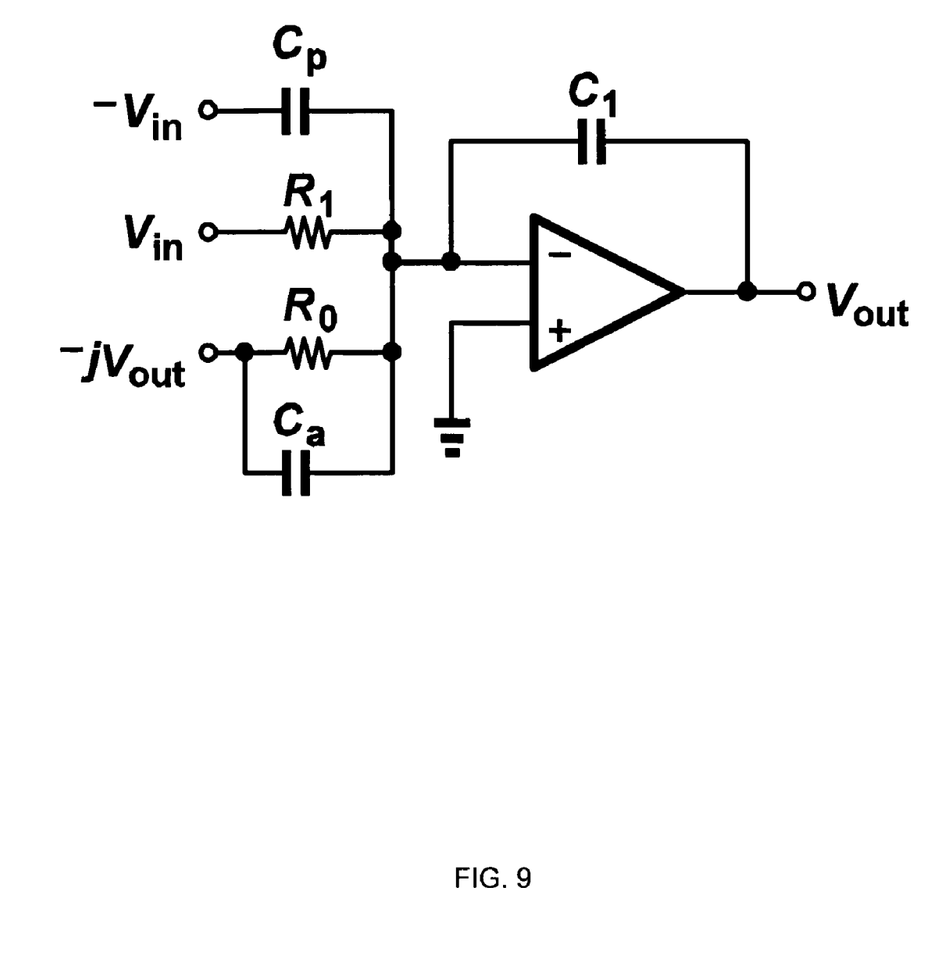
FIG. 9 is a circuit diagram illustrating a modified integrator, according to one embodiment of the present invention.

FIG. 7 is a circuit diagram illustrating one slice of a positive complex bandpass filter, according to one embodiment of the present invention. FIG. 8 is a circuit diagram illustrating a single-ended integrator, according to one embodiment of the present invention. FIG. 9 is a circuit diagram illustrating a modified integrator, according to one embodiment of the present invention.

In order to perform adequate channel selection, a Chebyshev filter of fifth order is used. The principal challenge in the design of the filter stems from the large number of op amps that provide a broad bandwidth while driving a heavy capacitive and resistive load.

According to one embodiment of the present invention, the positive complex band pass filter uses a technique that relaxes the op amp requirements, allowing a 20-fold reduction in the power consumed by the filters. Consider the single-ended integrator shown in FIG. 8, where the branch consisting of $-jV_{out}$ (the output of the Q channel) and $R_0$ shifts the complex filter frequency response to the right by $w_0=1/(R_0C_1)$. Inadequate op amp bandwidth here creates substantial peaking in the filter response near the upper edge. FIG. 9 depicts a modification that can suppress the high-frequency peaking. With the addition of $C_p$ and $C_a$ to the signal paths, the filter transfer function (for an ideal op amp) is given by $$\left|\frac{V_{out}}{V_{in}}(jw)\right| = \sqrt{\frac{1+w^2R_1^2C_p^2}{R_1^2C_1^2(w-w_0)^2+R_1^2C_a^2w^2}}$$

suggesting that $C_a$ reduces the peaking due to the limited band-width of the op amp, and $C_p$ compensates the high-frequency droop introduced by $C_a$.

FIG. 7 shows a slice of the positive complex filter and its connections to the preceding and following slices. For the negative complex filter, the $R_0$–$C_a$ branch in FIG. 9 is connected to $+jV_{out}$.

The complex band pass filters are tuned for process variations with digitally-controllable 4-bit array of capacitors. Each array consists of a fixed capacitance, half of the nominal capacitance, and a binary-weighted array of four capacitors.

According to one embodiment of the present invention, to suppress the noise of the latter stages and subsequent summers, the filter employs a nominal gain of 14 dB in the passband, thereby requiring cancellation or removal of the dc offsets produced by the mixers. Since ac coupling necessitates linear (low-density) capacitors, the offset is cancelled by feedback (FIG. 7) through the use of grounded (MOS) capacitors.

According to one embodiment of the present invention, the implementation described herein in reference to the positive complex bandpass filter can be modified to implement the negative complex bandpass filter by connecting the $R_0$–$C_a$ branch in FIG. 9 to $+jV_{out}$ or by switching the polarity of the $R_0$–$C_a$ branches in FIG. 7.

While the embodiment of the present embodiment described herein focuses on the application of a multiple-antenna receiver system, one skilled in the art will recognize that the system and methods described herein are also applicable to multiple-antenna transmitter systems. By combining the signals to be sent by various antennas into a common signal, multiple-antenna transmitter system hardware may be reduced. According to one embodiment of the present invention, the baseband signal to be transmitted from one antenna is upshifted to a positive intermediate frequency and the baseband signal to be transmitted from another antenna is upshifted to a negative intermediate frequency. The upshifted positive frequency signal and the negative upshifted frequency signal are combined to form a single complex signal, which can then be converted from digital to analog using a shared digital-to-analog converter unit. The resulting analog signal can then be separated for distribution to multiple antennas and upshifted as desired for transmission.

While particular embodiments and applications of the present invention have been illustrated and described herein, it is to be understood that the invention is not limited to the precise construction and components disclosed herein and that various modifications, changes, and variations may be made in the arrangement, operation, and details of the methods and appartuses of the present invention without departing from the spirit and scope of the invention as it is defined in the appended claims.

What is claimed is:

1. In a multiple-antenna receiver system, a method for converting signals from a plurality of antennas to a digital form, comprising the steps of:
    receiving a first signal from a first antenna at a first frequency channel;
    multiplying said first signal by a first complex exponential to produce a first shifted signal;
    applying a first band pass filter to said first shifted signal to produce a first filtered signal;
    receiving a second signal from a second antenna at said first frequency channel;
    multiplying said second signal by a second complex exponential to produce a second shifted signal;
    applying a second band pass filter to said second shifted signal to produce a second filtered signal;
    combining said first filtered signal and said second filtered signal to produce an output signal; and
    converting said output signal to a digital form to produce a digital signal.

2. The method of claim 1, wherein said first band pass filter comprises a first pass band, said first pass band including positive frequencies.

3. The method of claim 1, wherein said second band pass filter comprises a second pass band, said second pass band being including negative frequencies.

4. The method of claim 1, wherein said first shifted signal has a first complex portion at a first frequency band and a first real portion at a second frequency band, wherein said second shifted signal has a second complex portion at a first frequency band and a second real portion at a second frequency band and wherein said first and second band pass filters filter complex signals.

5. A multiple-antenna receiver system, for converting signals from a plurality of antennas to a digital form, comprising:
    first receiving means for receiving a first signal from a first antenna at a first frequency channel;
    first complex multiplication means for multiplying said first signal by a first complex exponential to produce a first shifted signal;
    first filter means for applying a first band pass filter to said first shifted signal to produce a first filtered signal;
    second receiving means for receiving a second signal from a second antenna at said first frequency channel;
    second complex multiplication means for multiplying said second signal by a second complex exponential to produce a second shifted signal;
    second filter means for applying a second band pass filter to said second shifted signal to produce a second filtered signal;
    filter combination means for combining said first filtered signal and said second filtered signal to produce an output signal; and
    digital conversion means for converting said output signal to a digital form to produce a digital signal.

6. The system of claim 5, wherein said first band pass filter comprises a first pass band, said first pass band including positive frequencies.

7. The system of claim 5, wherein said second band pass filter comprises a second pass band, said second pass band being including negative frequencies.

8. The system of claim 5, wherein said first shifted signal has a first complex portion at a first frequency band and a first real portion at a second frequency band, wherein said second shifted signal has a second complex portion at a first frequency band and a second real portion at a second frequency band and wherein said first and second band pass filters filter complex signals.

9. In a multiple-antenna receiver system, a method for operating at least two antennas operating simultaneously and combining the results converting signals from a plurality of antennas to a digital form, comprising the steps of:
    receiving a first signal from a first antenna at a first frequency channel;
    multiplying said first signal by a first complex exponential to produce a first shifted signal having a first complex portion at a first frequency band and a first real portion at a second frequency band;
    applying a first complex band pass filter to said first shifted signal to produce a first filtered signal;
    receiving a second signal from a second antenna at said first frequency channel;
    multiplying said second signal by said first complex exponential to produce a second shifted signal having a second complex portion at said first frequency band and a second real portion at said second frequency band;
    applying a second complex band pass filter to said second shifted signal to produce a second filtered signal;
    combining said first filtered signal and said second filtered signal to produce an output signal; and
    converting said output signal to a digital form to produce a digital signal.

10. The method of claim 9, wherein said first band pass filter comprises a first pass band, said first pass band including positive frequencies.

11. The method of claim 9, wherein said second band pass filter comprises a second pass band, said second pass band being including negative frequencies.

* * * * *